United States Patent [19]
Lai

[11] Patent Number: 4,942,586
[45] Date of Patent: Jul. 17, 1990

[54] HIGH POWER DIODE PUMPED LASER

[75] Inventor: Shui T. Lai, Del Mar, Calif.

[73] Assignee: Intelligent Surgical Lasers Inc., San Diego, Calif.

[21] Appl. No.: 343,949

[22] Filed: Apr. 25, 1989

[51] Int. Cl.$^5$ ................................................ H02S 3/14
[52] U.S. Cl. ........................................ 372/68; 372/75; 372/101
[58] Field of Search ...................... 372/92, 68, 75, 101, 372/69, 70, 71, 72

[56] References Cited

U.S. PATENT DOCUMENTS

| | | | |
|---|---|---|---|
| 4,439,861 | 3/1984 | Bradford | 372/75 |
| 4,554,666 | 11/1985 | Altman | 372/101 |
| 4,713,822 | 12/1987 | Lee | 372/75 |
| 4,791,631 | 12/1988 | Baumert et al. | 372/75 |

Primary Examiner—James W. Davie
Attorney, Agent, or Firm—Nydegger & Harshman

[57] ABSTRACT

A single cavity laser device comprises a diode pumped laser medium having a relatively high gain but a relatively low power. With this medium, a control laser beam is generated. Also positioned in the cavity is a second laser medium having a relatively large gain volume which is pumped by an array of laser diodes at a relatively low gain to create a reservoir of excited state ions. Positioned between these two diode pumped laser mediums is a beam expander which focuses the control laser beam onto the second laser medium to substantially fill the gain volume of the second laser medium. Stimulation of the excited ions in the gain volume of the second laser medium by photons in the control beam efficiently generates a laser beam of relatively high power.

29 Claims, 1 Drawing Sheet

HIGH POWER DIODE PUMPED LASER

FIELD OF THE INVENTION

This invention pertains to devices and apparatus which generate laser beams. More particularly, this invention pertains to the pumping mechanism for laser devices. The present invention is particularly, but not exclusively, useful for increasing the efficiency of diode pumped lasers.

BACKGROUND OF THE INVENTION

Lasers are well known and are usefully employed in many different applications. Despite such familiarity, however, there is still a need for more efficient means by which to generate laser beams. To understand this need, it is helpful to appreciate some of the more basic principles of laser physics.

For purposes of the present invention, two concepts or principles are of particular importance. These are "gain" and "power". Indeed, the main objective of the present invention is to provide means for the efficient use of obtainable gain in a laser medium for the generation of a relatively high power laser beam, i.e. a laser beam in which there is a high concentration of photons. Stated differently, it is desirable to generate a high power laser beam in which there are a large number of photons passing through a given cross-sectional area of the beam per unit of time. To obtain this high concentration, it almost goes without saying that photons must first be generated. This requires a laser medium having a gain which is suffucient to cause the medium to lase.

Simply stated, gain is the probability that the number of photons leaving a medium as output will be more than the number of photons which entered the medium as input. Also, gain is proportional to the number of excited ions per unit volume in the medium. Accordingly, for higher gain, it is desirable there be as many excited state ions as possible in a given gain volume. Further, each medium has threshold gain below which there are no photon emissions from the medium due to the losses which must be overcome before the medium will "lase" and generate a laser beam. Thus, it happens that, for a low gain condition below threshold, there will be excited state ions present in the medium but the medium will not lase. The present invention recognizes that such a supply of excited state ions in a low gain medium can be used to advantage.

As is well known, any laser medium must be "pumped", i.e. the medium must absorb photons and create excited state ions in the medium, before it will lase. One frequently used device for pumping a laser medium is the well known laser diode. The power available from a laser diode, however, is dimensionally dependent and is affected by the arrangement of the individual emitters in the diode. For example, a one half (0.5) watt diode typically consists of ten (10) emitters linearly arranged in a one hundred (100) micron length. Whereas the individual emitters can be placed in a side-by-side relationship with about ten (10) microns distance between emitters, if the individual emitters are to be placed in a stacked relationship, the distance between them must be increased to approximately three hundred (300) microns. Consequently, the power which can be generated by laser diodes has dimensional limitations. Further, laser diodes emit photons in a beam which has large divergence. Therefore, it is difficult to collect sufficient laser diode emitted photons and use them the efficiently "pump" a medium for generation of a relatively high power laser beam. On the other hand, although high power from a small emitter surface area is difficult to attain, it is possible to use the small emitter surface area of a laser diode and focus its output onto a very small volume of a laser medium to obtain a relatively high gain.

Where increase power is the object, laser diodes have some disadvantages. first, as already implied, in order to achieve a high gain condition, they require sophisticated optical arrangements in order to focus their output onto a very small volume of the laser crystal medium. Second, they cannot be effectively grouped to enlarge the gain volume in the laser medium. Thus, although a single one half (0.5) watt diode can be used to create a high gain medium, there is still a relatively low power output and as discussed above, the diodes cannot be effectively "stacked" with other diodes to create a high power laser beam from a high gain medium.

The present invention recognizes that a small volume of a laser medium can be pumped by a laser diode to achieve high gain and generate a laser beam. The present invention further recognizes that when a laser beam is so generated and directed through a large volume of excited state ions in a low gain medium, the result will be a relatively higher power beam. The present invention also recognizes that the low gain medium can be effectively pumped by laser diodes without any connecting optics to create a reservoir of excited state ions in the low gain medium.

In light of the above, it is an object of the present invention to provide a laser diode pumped laser device which will efficiently provide a higher power laser beam. Another object of the present invention is to provide relatively high power laser diode pumped laser device which uses a low gain medium of large volume. Still another object of the present invention is to provide a laser device which efficiently uses a reservoir of excited state ions in a low gain medium to increase the power or a laser beam. Yet another object of the present invention is to provide a diode pumped laser device which is relatively easy to manufacture and comparatively cost effective.

SUMMARY OF THE INVENTION

The laser device of the present invention comprises a single laser cavity in which a driving medium (e.g. a Nd:YLiF$_4$ (Nd:YLF) laser crystal) is pumped at relatively high gain by a laser diode to generate a control laser beam. According to the pumping power selected for the laser diode, the power of the control laser beam generated by the driving medium can be varied within a range. Beam expander optics, including coaxially aligned plano-concave and plano-convex lenses, are positioned to receive the control laser beam as it radiates from the driving crystal and to enlarge the cross-sectional area of this beam around the longitudinal axis of the cavity. A source medium (e.g. another Nd:YLF laser crystal) is also positioned in the cavity on the path of the control laser beam.

The source medium of the present invention is an elongated laser crystal which is positioned in the cavity to receive and allow the expanded control laser beam to pass through it lengthwise. Further, the source medium si pumped by at least one longitudinal linear diode array which is positioned in a side-by-side relationship to the source medium. Thus, although pumping of the source medium by the longitudinal linear diode array results in low gain, it nevertheless establishes a gain volume of excited ions in the source medium which can be stimulated by the control laser beam to create an even higher power laser beam. Further, the efficiency of the device is increased by focusing the control laser beam with the expander optics to fill gain volume of te source medium. An output coupler permits the emission of a portion of the higher power laser beam from the device while retaining a sufficient portion of photons in the device for further stimulation of excited ions in the source medium.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENT

Figure 1:
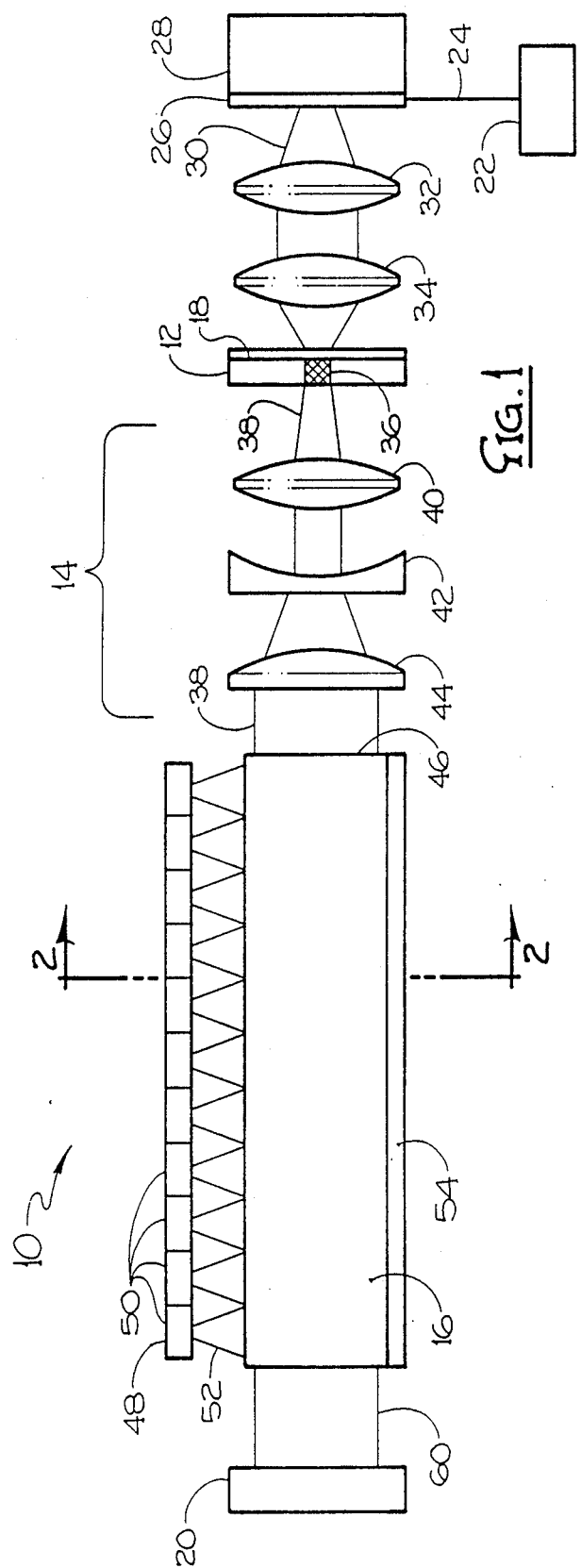
FIG. 1 is a schematic of the laser cavity of the preferred embodiment of the present invention.

Referring initially to FIG. 1, a schematic diagram of the laser device of the present invention is shown and generally designed 10. Specifically, FIG. 1 shows that laser device 10 comprises a primary or first laser medium 12 in combination with a beam expander 14 and a secondary laser medium 16. As shown, these components of device 10 are all within a single cavity which is established between the reflective coating 18 on primarily laser medium 12 and the output coupler 20.

Still referring to FIG. 1, it will be seen that a variable power source 22 is connected via a line 24 to a laser diode 26. The laser diode 26 may be of any type well known in the pertinent art and will typically require a heat sink 28 for dissipating the heat generated by operation of diode 26. Preferably, diode 26 will have a one half (0.5) watt capacity and emit monochromatic light having a wavelength of approximately 798 manometers. As is typical of all presently available laser diodes, the laser emission from laser diode 26 has divergence angles which are as large as thirty (30) degrees. This poses a restriction for the collection of the light and, to be effective, requires very short working distances between the laser diode 26 and the collecting optic 32, and between focusing lens 34 and primary medium 12.

In FIG. 1, the laser beam 30 emitted by diode 26 is shown incident on collimating lens 32 and then subsequently focused by focusing lens 34 onto the primary laser medium 12. Importantly, coating 18 is not reflective of the 798 manometer wavelength light in beam 30. As will be appreciated by the skilled artisan, coating 18 must allow beam 30 to enter the primary laser medium 12 in order for the medium 12 to be pumped. On the other hand, coating 18 must be reflective of the wavelength generated within the laser cavity.

As inteneded for the device 10, primary laser medium 12 is to be operated with a high gain. Therefore, the gain volume 36 of primary laser medium 12 will be relatively small. Indeed, whereas laser medium 12 itself is preferably a Nd:YLF laser crystal having dimensions of ten (10) millimeters by twelve (12) millimeters by five (5) millimeters thick, the cylindrical-shaped gain volume 36 of medium 12 will be only approximately five (5) millimeters long and have a diameter of only approximately one hundred twenty (120) microns. As will be appreciated by the skilled artisan, the exact dimensions of the medium will be dependent on its doping. For example, the dimensions given above are typical for a laser medium having one atomic percent neodymium (Nd) substituting yttrium (Y). The result is a relatively high gain volume within primary laser medium 12 which is used for the generation of a control laser beam 38 having a wavelength of approximately 1.053 microns.

After emission from primary laser source 12, laser beam 38 initially expands to approximately seven tenths (0.7) millimeters in diameter and passes through the beam expander optics 14. As shown, beam expander 14 preferably comprises an intracavity relay lens 40, a plano-concave lens 42 and a planoconvex lens 44. Together, these lenses 40, 42, and 44 transition control beam 38 from an output of primary laser medium 12 to an input for secondary medium 14. More specifically, relay lens 40 is used to control the laser mode volume and open up or extend the cavity. On the other hand, plano-concave lens 42 and plano-convex lens 44 act in concert to enlarge the cross-sectional area of control beam 38 around the longitudinal axis of the cavity. Preferably, beam expander 12 can enlarge control beam 38 to cover approximately three (3) times more area than it has upon leaving primary laser medium 12. As will be appreciated, this enlarged control laser beam 38 is directed to be incident on an end 46 of secondary laser medium 16.

As contemplated by the present invention, secondary laser medium 16 is preferably an elongated Nd:YLF laser crystal. In the preferred embodiment of the present invention, secondary medium 16 is a rectangular bar having a square cross section which is approximately two (2) millimeters by two (2) millimeters. In an alternate embodiment of secondary medium 16a, the crystal is a rod which is approximately two (2) millimeters in diameter. For either of these embodiments, the length of the crystal for secondary medium 16 is dependent only on the desired power level. This is so because secondary laser medium 16 is pumped by a linear diode array 48 which is placed lengthwise in a side-by-side relationship with secondary medium 16. The array 48 comprises a plurality of laser diodes 50 which are essentially similar to the laser diode 26. As so aligned, with diodes 50 in array 48 each emit respective beams 52 which are incident on laser medium 16 to pump the medium 16. The efficiency of this pumping action is enhanced by placing a highly reflective coating 54 on the surface of medium 16 opposite the array 48 which will allow the light to pass at least two times through the medium. Further, it is to be understood that the cross-sectional area of secondary laser medium 16 can be enlarged to accommodate a plurality of linear arrays 48 along any side.

Figure 3:
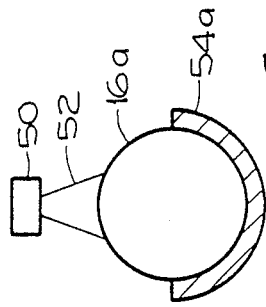
FIG. 3 is a cross-sectional view of an alternate embodiment of the secondary medium in the laser cavity as would be seen along the line 2—2 in FIG. 1.
Figure 2:
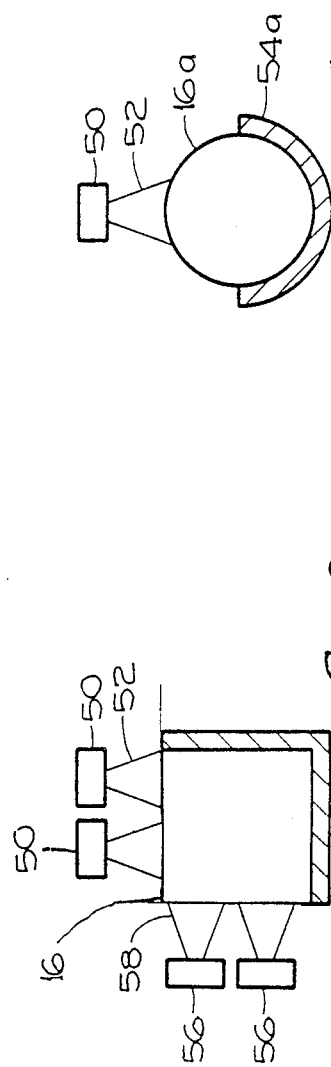
FIG. 2 is a cross-sectional view of the laser cavity as seen along the line 2—'in FIG. 1.

As best appreciated with reference to FIG. 2, for the embodiment wherein secondary medium 16 is a bar, an additional linear array of diodes 56 can be positioned lengthwise along the medium 16 to generate respective laser beam 58 and thereby provide additional pumping power for the medium 16. As shown in FIG. 3, for the alternate embodiment wherein secondary medium 16a is a rod, a single array 48 of diodes 50 is used and a reflective coating 54a provides increased efficiency for device 10 by reflecting the laser beam 52 back through secondary medium 16a.

As intended for device 10, the pumping of secondary medium 16 by linear diode array 48 is with a relatively low gain. As suggested in FIG. 2, another similar array may also be used. In either case, instead of employing collecting optics for the beams 52 and 58, diodes 50 and 56 are merely positioned very close to secondary medium 16. For purposes of the present invention this distance will be only on the order of one (1) millimeter. With this configuration, secondary medium 16 will become a reservoir or supply of excited state ions. Consequently, as enlarged beam 38 passes from beam expander 14 into and through the secondary medium 16, the photons in control laser beam 38 will generate additional photons from the excited state ions in secondary medium 16. Importantly, depending on the actual dimensions of the crystal used for secondary medium 16, and the gain volume created by diodes 50 and 56 in secondary medium 16, a predetermined gain volume will be established for secondary medium 16. Furthermore, and equally important, the control beam 38 is enlarged by beam expander 14 to fill this predetermined gain volume in secondary medium 16. The result is a relatively higher power laser beam 60 having a wavelength of approximately 1.053 microns which is emitted from secondary medium 16 and directed toward output coupler 20.

The output coupler 20 is a mirror which is preferably able to reflect between ninety and ninety-five percent (90-95%) of laser beam 60. Thus, output coupler 20 transmits approximately only five to ten percent (5-10%) of beam 60 and the majority of beam 60 is reflected back through the cavity to further stimulate photon emissions from the excited state ions in secondary laser medium 16.

Though not shown, it will be appreciated by the skilled artisan that device 10 may also include well known components to create a mode locked or a Q-switched laser. Additionally, it will be appreciated by the skilled artisan that Nd:YLF is only suggested as a laser medium. Indeed, many laser crystals will suffice for this purpose. For example, YAG may work as well or better than YLF depending on the particular application. Other host crystals could be used. Further, neodymium (Nd) may be replaced in the host crystal by a number of rare earth ions, such as holmium (Ho) and erbium (Er), or by a number or transition metal ions, such as cromium (Cr), titanium (Ti) and nickel (Ni).

While the particular high power diode pumped laser as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown than as defined in the appended claims.

I claim:

1. A device for generating a laser beam having a single cavity which comprises:
   a high gain madium for generating a control laser beam;
   a low gain medium;
   a longitudinal linear laser diode array for pumping said low gain medium to establish a predetermined gain volume defining a reservoir of excited ions; and
   a beam expander disposed between said high gain medium and said low gain medium for focusing said control beam onto said low gain medium to substantially fill said predetermined volume and generate a high power laser beam.

2. A device for generating a laser beam having a single cavity as recited in claim 1 further comprising a laser diode for pumping said high gain medium.

3. A device for generating a laser beam having a single cavity as recited in claim 1 wherein said high gain medium is a Nd:YLF laser crystal having a cross section approximately ten (10) mm by approximately twelve (12) mm and having a thickness or approximately five (5) mm.

4. A device for generating a laser beam having a single cavity as recited in claim 1 wherein said low gain medium is a rectangular-shaped Nd:YLF laser crystal having a cross section approximately two (2) mm by approximately two (2) mm and a length greater than one (1) cm.

5. A device for generating a laser beam having a single cavity as recited in claim 1 wherein said low gain medium is a tubular-shaped Nd:YLF laser crystal having a diameter of approximately two (2) mm and a length greater than one (1) cm.

6. A device for generating a laser beam having a single cavity as recited in claim 1 wherein said predetermined gain volume is substantially equal to the volume of said low gain medium.

7. A device for generating a laser beam having a single cavity as recited in claim 2 further comprising means for varying the pumping power of said laser diode to selectively establish the power of said control laser beam.

8. A device for generating a laser beam having a single cavity as recited in claim 1 wherein said longitudinal linear diode array is aligned lengthwise with respect to said low gain medium and approximately of equal length therewith.

9. A device for generating a laser beam having a single cavity as recited in claim 1 wherein said beam expander comprises a plano-convex lens coaxially aligned with a plano-concave lens.

10. A device for generating a laser beam having a single cavity as recited in claim 1 wherein said high gain medium establishes one end of said laser cavity and said device further comprises an output coupler mirror to establish the opposite end of the said laser cavity.

11. A device for generating a laser beam having a single cavity as recited in claim 1 wherein said linear laser diode array defines a preselected gain volume and said low gain medium has predetermined dimensions, said preselected gain volume and said predetermined dimensions defining, in combination, said predetermined gain volume.

12. A laser device which comprises:
   a laser crystal and a linear laser diode array disposed longitudinally thereto to pump said laser crystal and establish a predetermined gain volume in said crystal;
   means for generating a control laser beam; and
   means for focusing said control beam onto said predetermined gain volume to substantially fill said gain volume to stimulate said laser crystal and emit photons to enhance the laser power of said device.

13. A laser device as recited in claim 12 wherein said generating means comprises a laser crystal and a laser diode for pumping said laser crystal.

14. A laser device as recited in claim 13 further comprising means for varying the pumping power of said laser diode to selectively establish the power of said control laser beam.

15. A laser device as recited in claim 13 wherein said laser crystal for said generating means is a Nd:YLF laser crystal having a cross section approximately ten (10) mm by approximately twelve (12) mm and having a thickness of approximately five (5) mm.

16. A laser device as recited in claim 12 wherein said laser crystal for said source is a rectangular-shaped Nd:YLF laser crystal having a cross section approximately two (2) mm by approximately two (2) mm and a length greater than one (1) cm.

17. A laser device as recited in claim 12 wherein said laser crystal for said source is a tubular-shaped Nd:YLF laser crystal having a diameter of approximately two (2) mm and a length greater than one (1) cm.

18. A laser device as recited in claim 12 wherein said focusing means comprises a plano-convex lens coaxially aligned with a plano-concave lens.

19. A laser device which comprises:
   a first pumped laser medium for generating photon emissions;
   a second pumped laser medium, said second medium being pumped by a plurality of laser diodes to establish a predetermined gain volume for creating a supply of excited ions; and
   means for focusing said photon emissions from said first medium onto said second medium to fill said gain volume and stimulate additional photon emissions therefrom for said laser.

20. A laser device as recited in claim 19 having a laser cavity wherein said first medium, said focusing means and said second medium are sequentially aligned.

21. A laser device as recited in claim 19 wherein said first medium is pumped by a laser diode.

22. A laser device as recited in claim 19 wherein said first medium is a Nd:YLF laser crystal having a cross section approximately ten (10) mm by approximately twelve (12) mm and having a thickness of approximately five (5) mm.

23. A laser device as recited in claim 19 wherein said second medium is a rectangular-shaped Nd:YLF laser crystal having a cross section approximately two (2) mm by approximately two (2) mm and a length greater than one (1) cm.

24. A laser device as recited in claim 19 wherein said second medium is a tubular-shaped Nd:YLF laser crystal having a diameter of approximately two (2) mm and a length greater than one (1) cm.

25. A laser device as recited in claim 19 wherein said predetermined gain volume is substantially equal to the volume of said second medium.

26. A laser device as recited in claim 21 further comprising means for varying the pumping power of said laser diode to selectively increase or decrease the number of photon emissions from said first medium.

27. A laser device as recited in claim 19 wherein said focusing means comprises a plano-convex lens coaxially aligned with a plano-concave lens.

28. A method for generating a high power laser beam which comprises the steps of:
   pumping a first laser crystal to generate a control laser beam;
   pumping a second laser crystal with a linear laser diode array to establish a predetermined gain volume of excited ions; and
   focusing said control laser beam onto said second crystal to substantially fill said predetermined gain volume and stimulate said excited ions to produce said beam.

29. A method for generating a high power laser beam as recited in claim 28 further comprising the step of varying the power used for pumping said first crystal to selectively establish the power of said control laser beam.

* * * * *